(12) United States Patent  
Park et al.

(10) Patent No.: US 9,213,214 B2  
(45) Date of Patent: Dec. 15, 2015

(54) OPTICAL PATH-CHANGING DEVICE HAVING CURVED WAVEGUIDE

(71) Applicant: Korea Advanced Institute of Science and Technology, Daejeon (KR)

(72) Inventors: Hyo-Hoon Park, Gangwon-Do (KR); Jong Hun Kim, Daejeon (KR); Young-Tak Han, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 14/357,753

(22) PCT Filed: Oct. 22, 2012

(86) PCT No.: PCT/KR2012/008667  
§ 371 (c)(1),  
(2) Date: May 12, 2014

(87) PCT Pub. No.: WO2013/069909  
PCT Pub. Date: May 16, 2013

(65) Prior Publication Data  
US 2014/0307998 A1    Oct. 16, 2014

(30) Foreign Application Priority Data  
Nov. 11, 2011 (KR) .................. 10-2011-0117704  
Sep. 17, 2012 (KR) .................. 10-2012-0102950

(51) Int. Cl.  
*G02B 6/42* (2006.01)  
*G02F 1/313* (2006.01)  
*G02B 6/35* (2006.01)  
*G02F 1/315* (2006.01)  
*H04Q 11/00* (2006.01)

(52) U.S. Cl.  
CPC ............... *G02F 1/3137* (2013.01); *G02B 6/35* (2013.01); *G02B 6/354* (2013.01); *G02F 1/315* (2013.01); *H04Q 11/0005* (2013.01)

(58) Field of Classification Search  
CPC .. G02B 6/3512; G02B 6/3546; G02B 6/3556; G02B 6/356; G02B 6/35; G02B 6/354; G02F 1/1337; G02F 1/00; G02F 1/3137; G02F 1/315; H04Q 11/0005  
USPC ................................... 385/16–23, 31, 32, 40  
See application file for complete search history.

(56) References Cited

U.S. PATENT DOCUMENTS 5,764,825 A    6/1998 Mugino et al.  
6,526,193 B1 *  2/2003 He et al. ..................... 385/16

FOREIGN PATENT DOCUMENTS

| JP | 05-204008 | 8/1993 |
| JP | 10-300956 | 11/1998 |
| KR | 10-1998-073463 | 11/1998 |
| KR | 10-2010-0066834 | 6/2010 |
| KR | 10-2011-0055142 | 5/2011 |

OTHER PUBLICATIONS  
International Search Report for PCT/KR2012/008667, mailed Feb. 25, 2013.

* cited by examiner

Primary Examiner — Akm Enayet Ullah  
Assistant Examiner — Michael Mooney  
(74) Attorney, Agent, or Firm — Marshall, Gerstein & Borun LLP (57) ABSTRACT

In accordance with the present invention, there is provided an optical path-changing device having one or more curved waveguides, which not only can change an optical path at a large angle close to a perpendicular direction after light or an optical signal has been incident and reflected, but also can change the optical path in various directions, such as for straight pass, left turn, and right turn. An optical path-changing device having one or more curved waveguides according to an embodiment of the present invention includes a first waveguide (11) formed in a straight line. A second waveguide (12) is configured to branch from the first waveguide in a first direction and formed in a shape of curved line. A first reflector (21) is arranged in a region in which the second waveguide branches from the first waveguide.

15 Claims, 3 Drawing Sheets

OPTICAL PATH-CHANGING DEVICE HAVING CURVED WAVEGUIDE

TECHNICAL FIELD

The present invention relates, in general, to an optical path-changing device having one or more curved waveguides and, more particularly, to an optical path-changing device having one or more curved waveguides, which can change an optical path using a first waveguide having a shape of straight line and a second waveguide having a shape of curved line.

BACKGROUND ART

Korean Patent Application Publication No. 10-2010-0066834 (hereinafter referred to as "prior invention 1") discloses an optical communication device that switches an optical signal using a reflection output unit that is arranged in a portion of a main core and that forms a small angle. However, "prior invention 1" can be restrictively applied only to a structure for switching an optical signal to a waveguide forming a small angle because the reflection output unit branches from the main core at a small angle.

Further, Korean Patent Application Publication No. 10-2011-0055142 (hereinafter referred to as "prior invention 2") discloses an optical switch structure using reflection in a grid-shaped optical transmission network. However, "prior invention 2" is problematic in that it is configured using a structure in which, after being reflected, an optical signal is transmitted in the direction of a straight line having a small angle with respect to a reference direction, that is, in a diagonal direction, thus making it impossible to transmit light in a vertical direction at a switching node.

DISCLOSURE OF INVENTION

Technical Problem

Accordingly, the present invention has been made keeping in mind the above problems occurring in the prior art, and an object of the present invention is to provide an optical path-changing device having one or more curved waveguides, which not only can change an optical path at a large angle close to a perpendicular direction after light or an optical signal has been incident and reflected, but also can change the optical path in various directions, such as for straight pass, left turn, and right turn.

Solution to Problem

An optical path-changing device having one or more curved waveguides according to a preferred embodiment of the present invention includes a first waveguide formed in a shape of straight line; a second waveguide configured to branch from the first waveguide in a first direction and formed in a shape of curved line; a first reflector arranged in a region in which the second waveguide branches from the first waveguide; and a first controller configured to control a refractive index of the first reflector. In detail, the first reflector may selectively transmit light or an optical signal to the first waveguide or the second waveguide depending on a change in the refractive index of the first reflector controlled by the first controller. The optical path-changing device may further comprise a third waveguide configured to intersect the first waveguide and meet an end of the second waveguide, and formed in a shape of straight line.

Further, the optical path-changing device may further include a fourth waveguide configured to branch from the first waveguide in a second direction and formed in a curved line; a second reflector arranged in a region in which the fourth waveguide branches from the first waveguide; and a second controller configured to control a refractive index of the second reflector. In detail, the second reflector may selectively transmit light or an optical signal to the first waveguide or the fourth waveguide depending on a change in the refractive index of the second reflector controlled by the second controller.

Furthermore, an end of the second waveguide and an end of the fourth waveguide may individually meet the third waveguide in opposite directions with respect to an intersection of the first waveguide and the third waveguide. A first branch point that is a branch point at which the second waveguide branches from the first waveguide and a second branch point that is a branch point at which the fourth waveguide branches from the first waveguide may be different from each other.

In detail, preferably, when the first direction is a direction to the right of the first waveguide, the second direction may be a direction to left of the first waveguide, and when the first direction is a direction to the left of the first waveguide, the second direction may be a direction to the right of the first waveguide.

Further, a first branch point that is a branch point at which the second waveguide branches from the first waveguide and a second branch point that is a branch point at which the fourth waveguide branches from the first waveguide may be placed in an identical upper direction or an identical lower direction with respect to an intersection of the first waveguide and the third waveguide.

The optical path-changing device may further include a fifth waveguide configured to branch from the first waveguide in a third direction and formed in a curved line; a third reflector arranged in a region in which the fifth waveguide branches from the first waveguide; a third controller configured to control a refractive index of the third reflector; a sixth waveguide configured to branch from the first waveguide in a fourth direction and formed in a curved line; a fourth reflector arranged in a region in which the sixth waveguide branches from the first waveguide; and a fourth controller configured to control a refractive index of the fourth reflector. Preferably, a third branch point that is a branch point at which the fifth waveguide branches from the first waveguide and a fourth branch point that is a branch point at which the sixth waveguide branches from the first waveguide may be placed in an identical upper direction or an identical lower direction with respect to the intersection of the first waveguide and the third waveguide, and the third branch point and the first branch point may be placed in opposite directions with respect to the intersection of the first waveguide and the third waveguide. Further, an end of the fifth waveguide and an end of the sixth waveguide may individually meet the third waveguide in opposite directions with respect to the intersection of the first waveguide and the third waveguide.

In the optical path-changing device, a light or an optical signal may be input through a first end of the first waveguide and be output through a second end of the first waveguide or either one of both ends of the third waveguide, or the light or the optical signal may be input through a first end of the third waveguide and be output through a second end of the third waveguide or either one of both ends of the first waveguide.

An optical path-changing device having one or more curved waveguides according to another preferred embodiment of the present invention includes a first waveguide group formed in a straight line and configured to include one or more waveguides arranged in parallel; a second waveguide group formed in a curved line and configured to branch from the first waveguide group; a third waveguide group formed in a straight line and configured to intersect the first waveguide group and include one or more waveguides arranged in parallel; a first reflector group including reflectors respectively arranged in regions in which the second waveguide group branches from the first waveguide group; and a first controller group including controllers for controlling refractive indices of the respective reflectors included in the first reflector group, wherein an end of the second waveguide group meets the third waveguide group.

Further, preferably, the optical path-changing device may further include a fourth waveguide group formed in a curved line and configured to branch from the first waveguide group; a second reflector group including reflectors respectively arranged in regions in which the fourth waveguide branches from the first waveguide group; and a second controller group including controllers for controlling refractive indices of the respective reflectors included in the second reflector group, wherein an end of the fourth waveguide group meets the third waveguide group. Furthermore, the optical path-changing device may further include a fifth waveguide group formed in a curved line and configured to branch from the first waveguide group; a third reflector group including reflectors respectively arranged in regions in which the fifth waveguide group branches from the first waveguide group; a third controller group including controllers for controlling refractive indices of respective reflectors included in the third reflector group; a sixth waveguide group formed in a curved line and configured to branch from the first waveguide group; a fourth reflector group including reflectors respectively arranged in regions in which the sixth waveguide group branches from the first waveguide group; and a fourth controller group including controllers for controlling refractive indices of the respective reflectors included in the fourth reflector group, wherein an end of the fifth waveguide group and an end of the sixth waveguide group meet the third waveguide group.

In detail, a first branch point group including branch points at which the second waveguide group branches from the first waveguide group and a second branch point group including branch points at which the fourth waveguide group branches from the first waveguide group may be placed in identical directions with respect to individual intersections of the first waveguide group and the third waveguide group, a third branch point group including branch points at which the fifth waveguide group branches from the first waveguide group and a fourth branch point group including branch points at which the sixth waveguide group branches from the first waveguide group may be placed in identical directions with respect to the individual intersections of the first waveguide group and the third waveguide group, and the first branch point group and the third branch point group may be placed in opposite directions with respect to the individual intersections of the first waveguide group and the third waveguide group.

Further, each waveguide belonging to the second waveguide group and each waveguide belonging to the fourth waveguide group may individually meet a corresponding waveguide belonging to the third waveguide group in opposite directions with respect to a corresponding intersection of the first waveguide group and the third waveguide group, and each waveguide belonging to the fifth waveguide group and each waveguide belonging to the sixth waveguide group may individually meet a corresponding waveguide belonging to the third waveguide group in opposite directions with respect to a corresponding intersection of the first waveguide group and the third waveguide group.

Preferably, light or an optical signal may be input through a first end of a 1-1st waveguide that is one of waveguides belonging to the first waveguide group and be output through a second end of the 1-1st waveguide, either one of both ends of one of waveguides belonging to the first waveguide group other than the 1-1st waveguide, or either one of both ends of one of waveguides belonging to the third waveguide group, or the light or the optical signal may be input through a first end of a 3-1st waveguide that is one of waveguides belonging to the third waveguide group and be output through a second end of the 3-1st waveguide, either one of both ends of one of waveguides belonging to the third waveguide group other than the 3-1st waveguide, or either one of both ends of one of waveguides belonging to the first waveguide group.

Advantageous Effects of Invention

In accordance with an optical path-changing device having one or more curved waveguides according to preferred embodiments the present invention, there can be provided an optical path-changing device having one or more curved waveguides, which not only can change an optical path at a large angle close to a perpendicular direction after light or an optical signal has been incident and reflected, but also can change the optical path in various directions, such as for straight pass, left turn, and right turn.

MODE FOR THE INVENTION

Hereinafter, an optical path-changing device having one or more curved waveguides according to embodiments of the present invention will be described in detail with reference to the attached drawings.

The following embodiments of the present invention are merely intended to embody the present invention, and are not intended to restrict or limit the scope of the present invention. Contents that can be easily inferred by those skilled in the art from the detailed description and embodiments of the present invention are interpreted as being included in the scope of the present invention.

Figure 1:
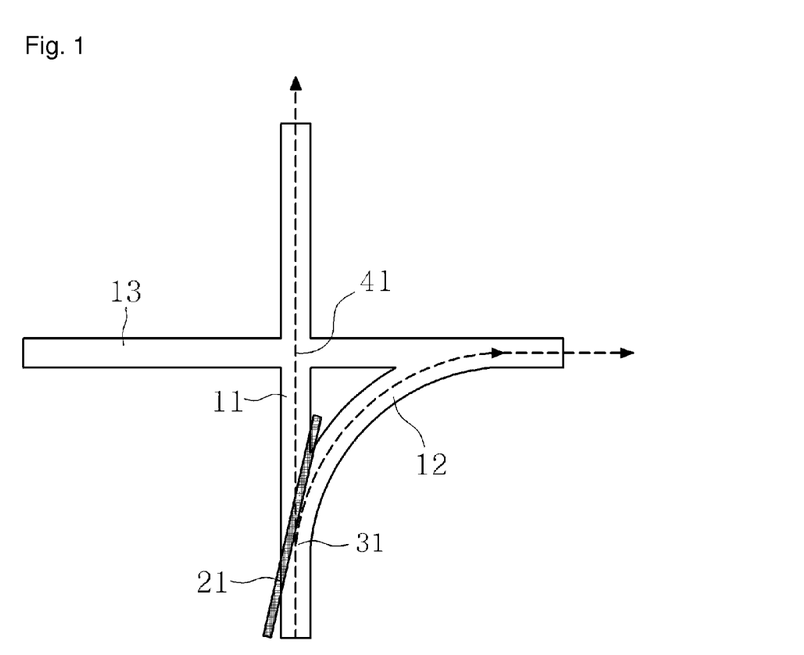
FIG. 1 is a plan view showing an optical path-changing device having one or more curved waveguides according to a first embodiment of the present invention.

First, FIG. 1 is a plan view showing an optical path-changing device having one or more curved waveguides according to a preferred first embodiment of the present invention.

As shown in FIG. 1, an optical path-changing device having one or more curved waveguides according to a first embodiment of the present invention includes a first waveguide 11, a second waveguide 12, a first reflector 21, a first controller (not shown), and a third waveguide 13.

In detail, the first waveguide 11 is formed in a straight line, and allows light or an optical signal to be incident thereon through one end of the first waveguide 11. Preferably, the second waveguide 12 has a shape branching from the first waveguide 11, forms a first angle in a first direction with respect to the first waveguide 11, and is formed in the shape of a smooth curve, such as the arc of a circle. The first reflector 21 is arranged in a region in which the second waveguide 12 branches from the first waveguide 11, and is configured to selectively transmit the light or the optical signal to the first waveguide 11 or the second waveguide 12. That is, when light is reflected by the reflector 21, the light or the optical signal is transmitted to the second waveguide 12, whereas when light passes through the reflector 21, the light or optical signal is transmitted to the first waveguide 11.

Further, the first controller (not shown) functions to generate a control signal required to control the refractive index of the first reflector 21, and then change the refractive index of the first reflector 21. Furthermore, preferably, the third waveguide 13 intersects the first waveguide 11, meets the end of the second waveguide 12, and is formed in a straight line.

That is, the optical path-changing device having one or more curved waveguides according to the first embodiment of the present invention may reflect the incident light at a small angle close to a total reflection angle using the first reflector 21, extract the light or optical signal to the curved second waveguide 12. The reflected light or optical signal can be merged into the third waveguide 13, which is not parallel with the first waveguide 11 and which intersects the first waveguide 11 at an angle close to a right angle through the curved second waveguide 12.

In detail, reflection effects are obtained by causing a change in the refractive index of the first reflector 21 using various control methods, such as voltage control, current control, and optical control, by means of the first controller (not shown), thus enabling light to be guided to a right-turn path. When a change in the refractive index of the first reflector 21 is not caused, the light passes straight.

The optical path-changing device having one or more curved waveguides according to the first embodiment of the present invention corresponds to a 2-way switch node structure capable of selecting one of straight pass and right turn. Although the optical path-changing device having one or more curved waveguides according to the first embodiment of the present invention discloses the 2-way switch node structure capable of selecting one of straight pass and right turn, it is apparent that such a structure can also be applied to a 2-way switch node capable of selecting one of straight pass and left turn.

Figure 2:
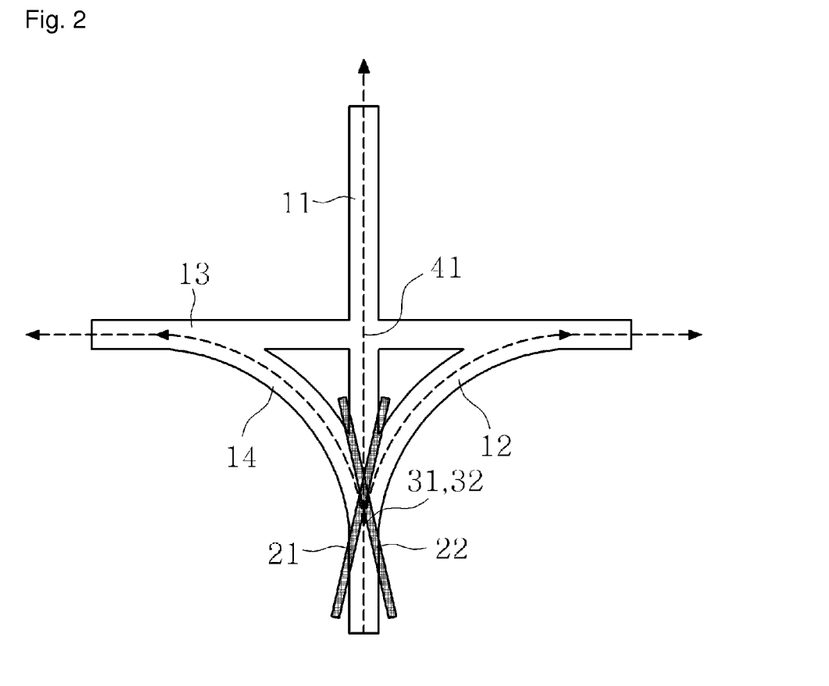
FIG. 2 is a plan view showing an optical path-changing device having one or more curved waveguides according to a second embodiment of the present invention.

Next, FIG. 2 is a plan view showing an optical path-changing device having one or more curved waveguides according to a preferred second embodiment of the present invention.

As can be seen from FIG. 2, the optical path-changing device having one or more curved waveguides according to the preferred second embodiment of the present invention includes a first waveguide 11, a second waveguide 12, a third waveguide 13, a first reflector 21, and a first controller (not shown), the same as the first embodiment shown in FIG. 1. Preferably, the optical path-changing device having one or more curved waveguides according to the second embodiment of the present invention further includes a fourth waveguide 14, a second reflector 22, and a second controller (not shown). In detail, the fourth waveguide 14 has a shape branching from the first waveguide 11, forms a second angle in a second direction with respect to the first waveguide 11, and has the shape of a smooth curve, such as the arc of a circle. Further, the second reflector 22 is arranged in a region in which the fourth waveguide 14 branches from the first waveguide 11, and is configured to selectively transmit light or an optical signal to the first waveguide 11 or the fourth waveguide 14. Further, the second controller (not shown) functions to change the refractive index of the second reflector 22 by controlling the refractive index of the second reflector 22.

The optical path-changing device having one or more curved waveguides according to the preferred second embodiment of the present invention corresponds to a 3-way switch node structure capable of selecting straight pass, right turn, or left turn. That is, the first direction and the second direction are opposite. In other words, when the first direction is a direction to the right of the first waveguide 11, the second direction is a direction to the left of the first waveguide 11. When the first direction is a direction to the left of the first waveguide 11, the second direction is a direction to the right of the first waveguide 11.

Further, as can be seen from FIG. 2, the optical path-changing device is characterized in that a first branch point 31 that is a branch point at which the second waveguide 12 branches from the first waveguide 11, and a second branch point 32 that is a branch point at which the fourth waveguide 14 branches from the first waveguide 11, are placed in an identical upper direction or an identical lower direction with respect to an intersection 41 of the first waveguide 11 and the third waveguide 13.

In the second embodiment of the present invention, the first reflector 21 and the second reflector 22 symmetrically intersect each other. When the refractive index of any one of the first reflector 21 and the second reflector 22 is controlled to be changed using the first controller (not shown) or the second controller (not shown), the light or the optical signal turns to the right or left. In contrast, when neither of the refractive indices of the first reflector 21 and the second reflector 22 is controlled to be changed, the light or the optical signal passes straight.

Further, in the second embodiment of the present invention shown in FIG. 2, the first branch point 31 that is a branch point at which the second waveguide 12 branches from the first waveguide 11, and the second branch point 32 that is a branch point at which the fourth waveguide 14 branches from the first waveguide 11, are identical to each other. Furthermore, the end of the second waveguide 12 and the end of the fourth waveguide 14 individually meet the third waveguide 13 in opposite directions (that is, at opposite locations of the third waveguide) with respect to the intersection 41 of the first waveguide 11 and the third waveguide 13.

Figure 3:
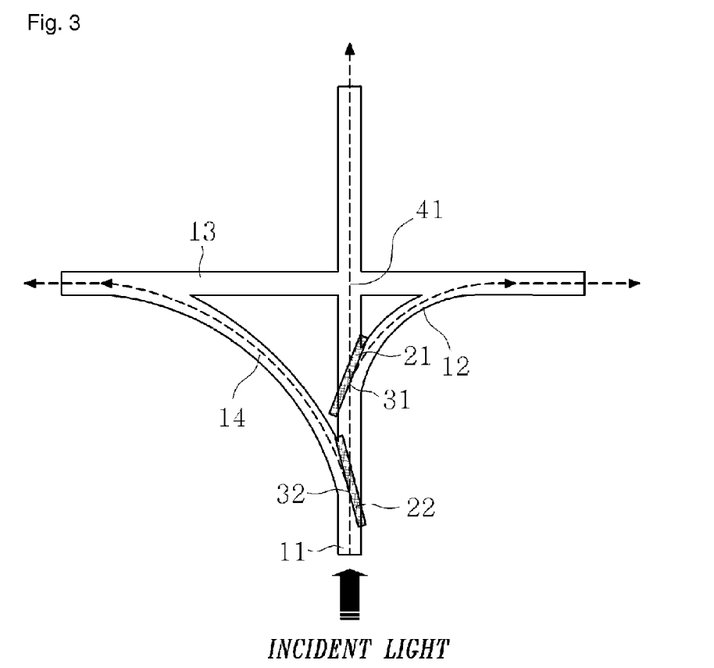
FIG. 3 is a plan view showing an optical path-changing device having one or more curved waveguides according to a third embodiment of the present invention.

FIG. 3 is a plan view showing an optical path-changing device having one or more curved waveguides according to a preferred third embodiment of the present invention.

As can be seen from FIG. 3, the optical path-changing device having one or more curved waveguides according to the third embodiment of the present invention has the same structure as that of the embodiment of FIG. 2, but is different from the embodiment of FIG. 2 in the arrangement of a first branch point 31 that is a branch point at which a second waveguide 12 branches from a first waveguide 11 and a second branch point 32 that is a branch point at which a fourth waveguide 14 branches from the first waveguide 11. That is, the third embodiment is characterized in that the first branch point 31 and the second branch point 32 are vertically arranged in upper and lower portions of the first waveguide 11. It can be seen that, thanks to the structure of the branch points 31 and 32, a first reflector 21 and a second reflector 22 can be arranged without intersecting symmetrically. That is, the optical path-changing device having one or more curved waveguides according to the third embodiment of the present invention presents a structure in which the locations of the reflectors 21 and 22 are separated without overlap each other for the case when an interaction between the reflectors 21 and 22 should be avoided in the 3-way switch node.

Figure 4:
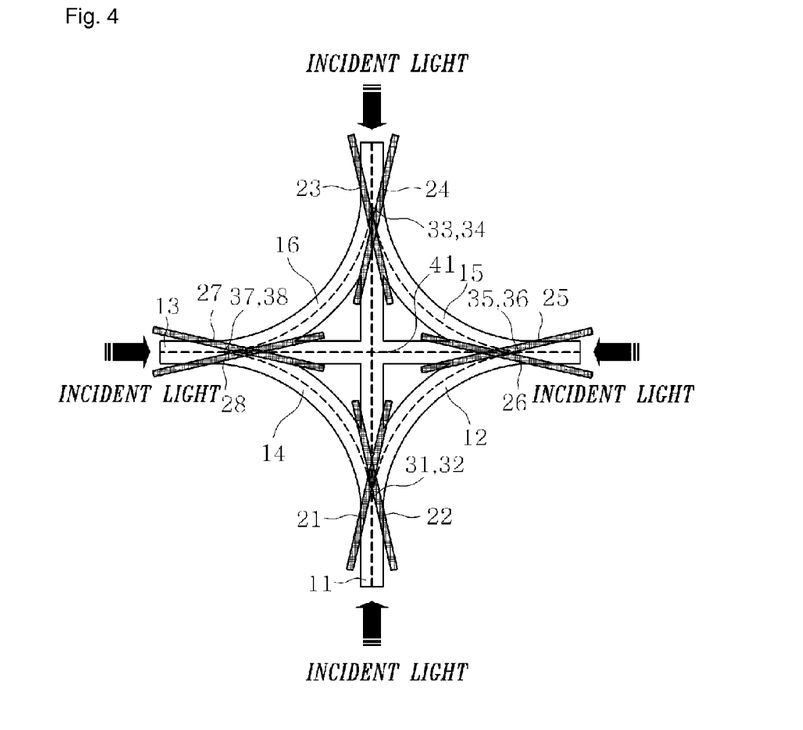
FIG. 4 is a plan view showing an optical path-changing device having one or more curved waveguides according to a fourth embodiment of the present invention.

FIG. 4 is a plan view showing an optical path-changing device having one or more curved waveguides according to a preferred fourth embodiment of the present invention.

As can be seen from FIG. 4, the optical path-changing device having one or more curved waveguides according to the fourth embodiment of the present invention includes a first waveguide 11, a second waveguide 12, a third waveguide 13, a fourth waveguide 14, a first reflector 21, a second reflector 22, a first controller (not shown), and a second controller (not shown), the same as the second and third embodiments of FIGS. 2 and 3.

Preferably, the optical path-changing device having one or more curved waveguides according to the fourth embodiment of the present invention further includes a fifth waveguide 15, a third reflector 23, a third controller (not shown), a sixth waveguide 16, a fourth reflector 24, and a fourth controller (not shown).

In detail, the fifth waveguide 15 has a shape branching from the first waveguide 11 with respect to a third branching point 33, forms a third angle in a third direction with respect to the first waveguide 11, and is formed in the shape of a smooth curve, such as the arc of a circle. Further, the third reflector 23 is arranged in a region in which the fifth waveguide 15 branches from the first waveguide 11, and is configured to selectively transmit light or an optical signal to the first waveguide 11 or the fifth waveguide 15. The third controller (not shown) functions to change the refractive index of the third reflector 23 by controlling the refractive index of the third reflector 23.

Preferably, the sixth waveguide 16 of the present invention has a shape branching from the first waveguide 11, forms a fourth angle in a fourth direction with respect to the first waveguide 11, and is formed in the shape of a smooth curve, such as the arc of a circle. Further, the fourth reflector 24 is arranged in a region in which the sixth waveguide 16 branches from the first waveguide 11, and is configured to selectively transmit light or an optical signal to the first waveguide 11 or the sixth waveguide 16. Furthermore, the fourth controller (not shown) functions to change the refractive index of the fourth reflector 24 by controlling the refractive index of the fourth reflector 24.

The same as the embodiment of FIG. 2, in the embodiment of FIG. 4, a first branch point 31 and a second branch point 32 are arranged at the same location and a third branch point 33 and a fourth branch point 34 are arranged at the same location, so that the first reflector 21 and the second reflector 22 are symmetrically arranged while intersecting each other, and the third reflector 23 and the fourth reflector 24 are symmetrically arranged while intersecting each other. However, it is apparent that, similar to the third embodiment of FIG. 3, even in the fourth embodiment of FIG. 4, the first branch point 31 and the second branch point 32 may be arranged at different locations so that the first reflector 21 and the second reflector 22 are implemented not to intersect, and the third branch point 33 and the fourth branch point 34 may be arranged at difference locations so that the third reflector 23 and the fourth reflector 24 are implemented not to intersect.

In detail, the optical path-changing device according to the fourth embodiment of the present invention is configured such that the third branch point 33 that is a branch point at which the fifth waveguide 15 branches from the first waveguide 11, and the fourth branch point 34 that is a branch point at which the sixth waveguide 16 branches from the first waveguide 11, are placed in an identical upper direction or in an identical lower direction on the first waveguide 11 with respect to the intersection 41 of the first waveguide 11 and the third waveguide 13. Further, the third branch point 33 and the first branch point 31 are placed in opposite directions (that is, at opposite locations) on the first waveguide 11 with respect to the intersection 41 of the first waveguide 11 and the third waveguide 13. Furthermore, the end of the fifth waveguide 15 and the end of the sixth waveguide 16 individually meet the third waveguide 13 so that they meet the third waveguide 13 in opposite directions (that is, at opposite locations) with respect to the intersection 41 of the first waveguide 11 and the third waveguide 13. That is, the ends of the fifth and sixth waveguides 15 and 16 are placed in opposite directions (that is, at opposite locations) on the fourth waveguide 14 with respect to the intersection 41.

Furthermore, points at which the third waveguide 13 individually meets the second waveguide 12, the fourth waveguide 14, the fifth waveguide 15, and the sixth waveguide 16 are also branch points 35, 36, 37, and 38 from the third waveguide 13. That is, in order to control an optical path when light or an optical signal is input through the third waveguide 13, there is a need to arrange the fifth reflector 25, the sixth reflector 26, the seventh reflector 27, and the eighth reflector 28 in respective branch regions, as shown in FIG. 4. Preferably, the optical path-changing device according to the fourth embodiment of the present invention further includes fifth to eighth controllers (not shown) so as to control the refractive indices of the respective reflectors 25, 26, 27, and 28.

The optical path-changing device having one or more curved waveguides according to the preferred fourth embodiment of the present invention is configured to arrange the 3-way switch node structures according to the second or third embodiment of the present invention in the shape of a grid, thus configuring a network structure capable of transmitting light or an optical signal to a desired place as in the case of a road network. As can be seen from the fourth embodiment of FIG. 4, 3-way switch nodes are installed in respective input directions of the intersections so that bidirectional light transmission is possible at the intersections, thus configuring a single unit switch node. In this switch node, the 2-way switch node according to the first embodiment and the 3-way switch node according to the second or third embodiment may be arbitrary selected depending on the locations of intersections and the traveling direction of light, and thus various networks can be configured.

That is, in the optical path-changing device having one or more curved waveguides according to the fourth embodiment of the present invention, light or an optical signal may be input through one end of the first waveguide 11 and may be output through the other end of the first waveguide 11 (in the case of straight pass) or through one of both ends of the third waveguide 13 (in the case of left turn or right turn). Similarly, the light or optical signal may be input through one end of the third waveguide 13 and may be output through the other end of the third waveguide 13 (in the case of straight pass) or through one of both ends of the first waveguide 11 (in the case of left turn or right turn).

Figure 5:
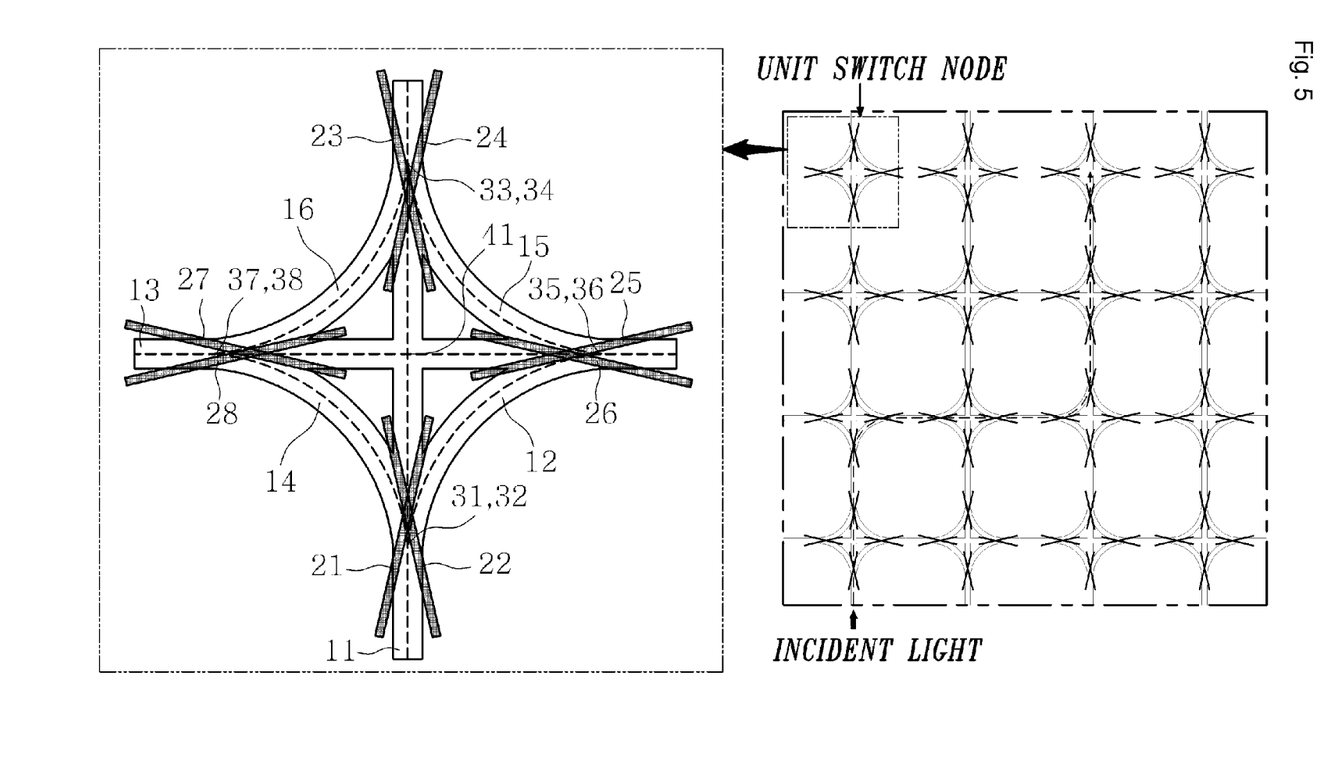
FIG. 5 is an optical path-changing device having one or more curved waveguides according to a fifth embodiment of the present invention.

FIG. 5 is a plan view showing an optical path-changing device having one or more curved waveguides according to a preferred fifth embodiment of the present invention.

As can be seen from FIG. 5, the optical path-changing device having one or more curved waveguides according to the preferred fifth embodiment of the present invention is implemented such that the optical path-changing device according to the fourth embodiment shown in FIG. 4 is used as a single unit switch node and a plurality of unit switch nodes are arranged in the shape of a grid. The optical path-changing device can transmit the light or the optical signal to a desired place within the grid by changing, maximum two times, the direction of light or an optical signal.

As can be seen from FIG. 5, the optical path-changing device having one or more curved waveguides according to the fifth embodiment of the present invention is characterized as follows. That is, the optical path-changing device includes first to third waveguide groups, a first reflector group, and a first controller group. The first waveguide group is formed in a straight line and includes one or more waveguides 11 arranged in parallel, and the second waveguide group includes one or more curved waveguides 12 branching from the first waveguide group. The third waveguide group is formed in a straight line and is configured to intersect the first waveguide group and include one or more waveguides 13 arranged in parallel. The first reflector group includes reflectors 21 respectively arranged in regions in which the second waveguide group branches from the first waveguide group. The first controller group includes controllers (not shown) for controlling the refractive indices of the respective reflectors 21 included in the first reflector group. In this case, the end of the second waveguide group meets the third waveguide group.

Preferably, the optical path-changing device according to the present invention may further include a fourth waveguide group including one or more curved waveguides 14 branching from the first waveguide group, a second reflector group including reflectors 22 respectively arranged in regions in which the fourth waveguide group branches from the first waveguide group, and a second controller group including controllers (not shown) for controlling the refractive indices of the respective reflectors 22 included in the second reflector group. Further, preferably, the end of the fourth waveguide group meets the third waveguide group.

Preferably, the optical path-changing device according to the present invention may further include a fifth waveguide group, a third reflector group, a third controller group, a sixth waveguide group, a fourth reflector group, and a fourth controller group. The fifth waveguide group includes one or more curved waveguides 15 branching from the first waveguide group. The third reflector group includes reflectors 23 respectively arranged in regions in which the fifth waveguide group branches from the first waveguide group. The third controller group includes controllers (not shown) for controlling the refractive indices of the respective reflectors 23 included in the third reflector group. The sixth waveguide group includes one or more curved waveguides 16 branching from the first waveguide group. The fourth reflector group including reflectors 24 respectively arranged in regions in which the sixth waveguide group branches from the first waveguide group. The fourth controller group includes controllers (not shown) for controlling the refractive indices of the respective reflectors 24 included in the fourth reflector group. Furthermore, the optical path-changing device is characterized in that the end of the fifth waveguide group and the end of the sixth waveguide group meet the third waveguide group.

For reference, FIG. 5 exemplarily shows an optical path-changing device including four unit switch nodes. That is, the optical path-changing device of FIG. 5 includes four first waveguides 11 and four third waveguides 13. Further, it can be seen that the numbers of the second waveguides 12, the fourth waveguides 14, the fifth waveguides 15, and the sixth waveguide 16 included in the optical path-changing device of FIG. 5 are equally 16.

In detail, the optical path-changing device having one or more curved waveguides according to the preferred fifth embodiment of the present invention is configured such that a first branch point group including branch points 31 at which the second waveguide group branches from the first waveguide group, and a second branch point group including branch points 32 at which the fourth waveguide group branches from the first waveguide group, are placed in identical directions with respect to the intersections 41 of the first waveguide group and the third waveguide group. Further, a third branch point group including branch points 33 at which the fifth waveguide group branches from the first waveguide group and a fourth branch point group including branch points 34 at which the sixth waveguide group branches from the first waveguide group, are placed in identical directions with respect to the intersections 41 of the first waveguide group and the third waveguide group. Meanwhile, the first branch point group (or the second branch point group) and the fourth branch point group (or the third branch point group) are placed in opposite directions (that is, at opposite locations) with respect to the intersections 41 of the first waveguide group and the third waveguide group.

Furthermore, the end of the second waveguide group, the end of the fourth waveguide group, the end of the fifth waveguide group, and the end of the sixth waveguide group meet the third waveguide group. However, the locations at which the second waveguide group and the fourth waveguide group meet the third waveguide group are placed in opposite directions (that is, at opposite locations) with respect to a corresponding waveguide belonging to the first waveguide group. The locations at which the fifth waveguide group and the sixth waveguide group meet the third waveguide group are placed in opposite directions (that is, at opposite locations) with respect to a corresponding waveguide belonging to the first waveguide group.

Preferably, the optical path-changing device having one or more curved waveguides according to the fifth embodiment of the present invention may further include fifth to eighth reflector groups respectively including reflectors 25 to 28 respectively arranged at fifth to eighth branch points 35 to 38. In addition, preferably, the optical path-changing device of the present invention further includes fifth to eighth controller groups including respective controllers (not shown) for controlling the refractive indices of the respective reflectors 25 to 28.

Furthermore, the optical path-changing device having one or more curved waveguides according to the fifth embodiment of the present invention is configured such that light or an optical signal may be input through one end of a 1-1st waveguide that is one of waveguides 11 belonging to the first waveguide group, and may be output through the other end of the 1-1st waveguide, one of both ends of one of the waveguides 11 of the first waveguide group other than the 1-1st waveguide, or one of both ends of one of the waveguides 13 belonging to the third waveguide group. Similarly, light or an optical signal may be input through one end of a 3-1st waveguide that is one of the waveguides 13 belonging to the third waveguide group, and may be output through the other end of the 3-1st waveguide, one of both ends of one of the waveguides 13 belonging to the third waveguide group other than the 3-1st waveguide, or one of both ends of one of the waveguides 11 belonging to the first waveguide group.

In the first to fifth embodiments of the present invention, the direction of an optical path can be changed even in the case where the waveguides intersect in the wide angle range of 0°<θ<180°, as well as the case where the waveguides intersect at a right angle, by changing angles of the arcs of the waveguides 12, 14, 15, and 16 respectively belonging to the second, fourth, fifth, and sixth waveguide groups that are curved waveguides.

In accordance with the preferred embodiments of the present invention, other available paths can be selected and light can be transmitted to the same location as if a detour has been used when a specific path is occupied or failed. Further, in accordance with the preferred embodiments of the present invention, the above configuration can be modified in other various forms using the basic switch node and the grid of the present invention as if various types of intersections and turning forms could be configured in a road network and various road networks could be configured using combinations thereof.

For reference, in a material, a change in a refractive index can be obtained by various effects, such as an electro-optic effect, an electroabsorption effect, a carrier-doping effect based on plasma dispersion of electrons and holes, a thermo-optic effect, an acousto-optic effect, a nonlinear effect, and a surface plasmonic effect. However, in most materials, the change in the refractive index depending on such effects is very small such as 0.01 or less. When the refractive index change $(n_1-n_2)/n_1$ is very small, the critical angle is small such as several degrees (°).

For example, when a silicon semiconductor material is doped with p-type or n-type impurities, a refractive index becomes lower than that in an intrinsic state due to carriers of electrons and holes. The effect exhibits that, when the concentration of an acceptor and a donor ranges from $5 \times 10^{17}$ to $1 \times 10^{20}$, a theoretical refractive index is lower than that of intrinsic silicon ($n_1$ is about 3.5) by about $5 \times 10^{-4}$ to $1 \times 10^{-1}$. That is, a difference between the refractive indices in a doping state and an intrinsic state, that is, $\Delta n = n_1 - n_2$, falls within a range from −0.0005 to −0.1, and $(n_1-n_2)/n_1$ falls within a range from −0.00015 to −0.03. In the above range of the refractive index, the critical angle falls within a range from 1° to 15°. Even in other materials, the change in the refractive index caused by an electric field or doping does not greatly exceed the above-described range of the refractive index change. Even in materials that can be generally utilized, when the range of a refractive index change that can be obtained by an electric field is taken into consideration, the critical angle is small enough to fall within the range of 20° or less. Therefore, the term indicating the reflection at a "small angle" in the present invention means reflection occurring within the range of 20° or less in which total reflection can be realistically obtained depending on the refractive index change. The present invention uses a principle on which an optical path can be changed at a small total reflection angle falling within the above-described range depending on the small refractive index change within the above-described range.

For reference, each of the reflectors 21 to 28 according to the present invention is made of a material, the refractive index of which can be changed due to the electro-optic effect, electroabsorption effect, carrier-doping effect based on plasma dispersion of electrons and holes, thermo-optic effect, acousto-optic effect, nonlinear effect, surface plasmonic effect, or the like.

The change in the refractive index of each of the reflectors 21 to 28 based on the above-described effects is generally caused by the injection of an electric field or current (or carriers). By way of example of this case, electrodes capable of applying an electric field or current (or carriers) can be installed near the waveguides, so that the refractive indices of the reflectors 21 to 28 can be controlled using controllers having the function of controlling refractive indices. If the nonlinear effect or surface plasmonic effect is used, the refractive index can also be changed by light rather than electricity, so that the reflectors 21 to 28 using light as control signals can also be installed. Such electricity control signals or light control signals are generated by the controllers and are transmitted to the reflectors 21 to 28, and thus the refractive indices of the reflectors 21 to 28 are changed.

In accordance with the above-described optical path-changing device having one or more curved waveguides according to the present invention, the optical path-changing device can be used for the transmission of optical signals containing data, or simple light, and the paths of optical signals having various properties can be changed at various angles without being greatly influenced by the wavelength, mode, intensity, etc. of light.

That is, in accordance with the optical path-changing device having one or more curved waveguides according to the preferred embodiments of the present invention, an optical path-changing device having one or more curved waveguides can be provided, which can change an optical path at a large angle close to a perpendicular direction after light or an optical signal has been incident and reflected, and can change the optical path in various directions, such as for straight pass, left turn, and right turn.

INDUSTRIAL APPLICABILITY

The optical path-changing device having one or more curved waveguides according to the present invention can be used as a data transfer network in memory chips or microprocessor chips. Such a memory chip or microprocessor chip is generally implemented such that memory cells or logic cells are integrated in the shape of a grid. Accordingly, it can be seen that a data transfer network having a grid network structure according to the present invention, in which switch nodes are arranged in the shape of a grid, can be easily applied to the chip in which cells are integrated in the shape of a grid. It is apparent that the optical path-changing device having one or more curved waveguides according to the present invention can be applied to the transmission of data between chips when these chips are integrated on a system board. Furthermore, the present invention can also be applied to the distribution of an optical clock signal within each chip (intrachip) or between chips (interchip).

The invention claimed is:

1. An optical path-changing device having one or more curved waveguides, comprising:
    a first waveguide formed in a shape of straight line;
    a second waveguide configured to branch from the first waveguide in a first direction and formed in a shape of curved line;
    a third waveguide configured to intersect the first waveguide and meet an end of the second waveguide, and formed in a shape of straight line;
    a first reflector arranged in a region in which the second waveguide branches from the first waveguide;
    and a first controller configured to control a refractive index of the first reflector,
    wherein the first reflector selectively transmits light or an optical signal to the first waveguide or the second waveguide depending on a change in the refractive index of the first reflector controlled by the first controller.

2. The optical path-changing device of claim 1, further comprising:
- a fourth waveguide configured to branch from the first waveguide in a second direction and formed in a shape of curved line;
- a second reflector arranged in a region in which the fourth waveguide branches from the first waveguide; and
- a second controller configured to control a refractive index of the second reflector, wherein the second reflector selectively transmits light or an optical signal to the first waveguide or the fourth waveguide depending on a change in the refractive index of the second reflector controlled by the second controller.

3. The optical path-changing device of claim 2, wherein an end of the second waveguide and an end of the fourth waveguide individually meet the third waveguide in opposite directions with respect to an intersection of the first waveguide and the third waveguide.

4. The optical path-changing device of claim 2, wherein a first branch point that is a branch point at which the second waveguide branches from the first waveguide and a second branch point that is a branch point at which the fourth waveguide branches from the first waveguide are different from each other.

5. The optical path-changing device of claim 2, wherein a first branch point that is a branch point at which the second waveguide branches from the first waveguide and a second branch point that is a branch point at which the fourth waveguide branches from the first waveguide are placed in an identical upper direction or an identical lower direction with respect to an intersection of the first waveguide and the third waveguide.

6. The optical path-changing device of claim 5, further comprising:
- a fifth waveguide configured to branch from the first waveguide in a third direction and formed in a shape of curved line;
- a third reflector arranged in a region in which the fifth waveguide branches from the first waveguide;
- a third controller configured to control a refractive index of the third reflector;
- a sixth waveguide configured to branch from the first waveguide in a fourth direction and formed in a shape of curved line;
- a fourth reflector arranged in a region in which the sixth waveguide branches from the first waveguide; and
- a fourth controller configured to control a refractive index of the fourth reflector.

7. The optical path-changing device of claim 6, wherein:
- a third branch point that is a branch point at which the fifth waveguide branches from the first waveguide and a fourth branch point that is a branch point at which the sixth waveguide branches from the first waveguide are placed in an identical upper direction or an identical lower direction with respect to the intersection of the first waveguide and the third waveguide, and
- the third branch point and the first branch point are placed in opposite directions with respect to the intersection of the first waveguide and the third waveguide.

8. The optical path-changing device of claim 6, wherein an end of the fifth waveguide and an end of the sixth waveguide individually meet the third waveguide in opposite directions with respect to the intersection of the first waveguide and the third waveguide.

9. The optical path-changing device of claim 1, wherein:
- a light or an optical signal is input through a first end of the first waveguide and is output through a second end of the first waveguide or either one of both ends of the third waveguide, or
- the light or the optical signal is input through a first end of the third waveguide and is output through a second end of the third waveguide or either one of both ends of the first waveguide.

10. An optical path-changing device having one or more curved waveguides, comprising:
- a first waveguide group formed in a shape of straight line and configured to include one or more waveguides arranged in parallel;
- a second waveguide group formed in a shape of curved line and configured to branch from the first waveguide group;
- a third waveguide group formed in a shape of straight line and configured to intersect the first waveguide group and include one or more waveguides arranged in parallel;
- a first reflector group including reflectors respectively arranged in regions in which the second waveguide group branches from the first waveguide group; and
- a first controller group including controllers for controlling refractive indices of the respective reflectors included in the first reflector group,
- wherein an end of the second waveguide group meets the third waveguide group.

11. The optical path-changing device of claim 10, further comprising:
- a fourth waveguide group formed in a shape of curved line and configured to branch from the first waveguide group;
- a second reflector group including reflectors respectively arranged in regions in which the fourth waveguide branches from the first waveguide group; and
- a second controller group including controllers for controlling refractive indices of the respective reflectors included in the second reflector group,
- wherein an end of the fourth waveguide group meets the third waveguide group.

12. The optical path-changing device of claim 11, further comprising:
- a fifth waveguide group formed in a shape of curved line and configured to branch from the first waveguide group;
- a third reflector group including reflectors respectively arranged in regions in which the fifth waveguide group branches from the first waveguide group;
- a third controller group including controllers for controlling refractive indices of respective reflectors included in the third reflector group;
- a sixth waveguide group formed in a shape of curved line and configured to branch from the first waveguide group;
- a fourth reflector group including reflectors respectively arranged in regions in which the sixth waveguide group branches from the first waveguide group; and
- a fourth controller group including controllers for controlling refractive indices of the respective reflectors included in the fourth reflector group,
- wherein an end of the fifth waveguide group and an end of the sixth waveguide group meet the third waveguide group.

13. The optical path-changing device of claim 12, wherein:
- a first branch point group including branch points at which the second waveguide group branches from the first waveguide group and a second branch point group including branch points at which the fourth waveguide group branches from the first waveguide group are placed in identical directions with respect to individual intersections of the first waveguide group and the third waveguide group, a third branch point group including branch points at which the fifth waveguide group branches from the first waveguide group and a fourth branch point group including branch points at which the sixth waveguide group branches from the first waveguide group are placed in identical directions with respect to the individual intersections of the first waveguide group and the third waveguide group, and the first branch point group and the third branch point group are placed in opposite directions with respect to the individual intersections of the first waveguide group and the third waveguide group.

14. The optical path-changing device of claim 13, wherein:

each waveguide belonging to the second waveguide group and each waveguide belonging to the fourth waveguide group individually meet a corresponding waveguide belonging to the third waveguide group in opposite directions with respect to a corresponding intersection of the first waveguide group and the third waveguide group, and each waveguide belonging to the fifth waveguide group and each waveguide belonging to the sixth waveguide group individually meet a corresponding waveguide belonging to the third waveguide group in opposite directions with respect to a corresponding intersection of the first waveguide group and the third waveguide group.

15. The optical path-changing device of claim 10, wherein:

light or an optical signal is input through a first end of a 1-1st waveguide that is one of waveguides belonging to the first waveguide group and is output through a second end of the 1-1st waveguide, either one of both ends of one of waveguides belonging to the first waveguide group other than the 1-1st waveguide, or either one of both ends of one of waveguides belonging to the third waveguide group, or the light or the optical signal is input through a first end of a 3-1st waveguide that is one of waveguides belonging to the third waveguide group and is output through a second end of the 3-1st waveguide, either one of both ends of one of waveguides belonging to the third waveguide group other than the 3-1st waveguide, or either one of both ends of one of waveguides belonging to the first waveguide group.

* * * * *